Sept. 28, 1954     K. A. MARGGRAF ET AL     2,690,531
ELECTROMECHANICAL INTEGRATOR

Filed March 22, 1952            2 Sheets-Sheet 1

INVENTORS.
Kurt A. Marggraf
Werner F. Massmann
By Wallenstein & Spangenberg
attys Sept. 28, 1954  K. A. MARGGRAF ET AL  2,690,531
ELECTROMECHANICAL INTEGRATOR
Filed March 22, 1952  2 Sheets-Sheet 2

INVENTOR.S.
Kurt A. Marggraf
Werner F. Massmann
By: Wallenstein & Spangenberg Attys Patented Sept. 28, 1954

2,690,531

UNITED STATES PATENT OFFICE 2,690,531

ELECTROMECHANICAL INTEGRATOR

Kurt A. Marggraf and Werner F. Massmann, Lemont, Ill., assignors to Ampatco Laboratories Corporation, Lemont, Ill., a corporation of Delaware Application March 22, 1952, Serial No. 278,098

23 Claims. (Cl. 318—28)

This invention is directed to an electromechanical integrator for integrating a variable condition with respect to time.

The principal object of this invention is to provide an electromechanical integrator wherein a variable condition may be accurately integrated with respect to time, wherein a variable speed reversible electric motor performs the time integration, wherein the direction and speed of the electric motor is accurately controlled by the direction and degree of deviation of the variable condition, wherein the angular position of the electric motor or an indicator positioned thereby accurately reflects the time integral of the variable condition, wherein the time response of the integrator is extremely rapid, wherein "hunting" of the integrator and its electric motor is substantially eliminated, wherein the voltage drop across the motor armature is compensated for for further increasing the accuracy of the integrator, which is simple and rugged in construction and which is inexpensive to manufacture and maintain.

Briefly, the electromechanical integrator of this invention includes a galvanometer having a magnetic field, a rotor rotatable about an axis transverse to the magnetic field and potentiometer means operated by the rotor and adjusted in one direction or the other as the rotor rotates in one direction or the other. Means responsive to the condition to be integrated applies a turning force to the rotor of the galvanometer in one direction or another and in varying degree. The integrator also includes a variable speed reversible electric motor which is positioned in accordance with the time integral of the variable condition. Electrical connections extend between the potentiometer means and the electric motor for actuating the electric motor in one direction or the other and at a rate corresponding to the adjustment of the potentiometer means. A coil is carried by the rotor in the magnetic field of the galvanometer for applying a turning force to the rotor in opposition to the turning force applied by the condition responsive means. Means are controlled by the electric motor for energizing that coil in response to the direction and rate of operation of the electric motor for balancing the turning force applied by the condition responsive means. As a result the electric motor is controlled and operated in a direction and at a rate corresponding to the direction and degree of the turning force applied by the condition responsive means for positioning the motor in accordance with the time integral of the condition.

This latter means for controlling the energization of the coil in response to the direction and rate of operation of the electric motor may take various forms. For example, in one form the coil may be electrically connected across the electric motor to respond to its back E. M. F. and hence its direction and speed of operation. Here an additional coil in opposition to the first coil may be connected across a resistor in the electric motor circuit to compensate for the voltage drop across the electric motor to provide true operation in accordance with the generated back E. M. F. of the electric motor and hence more accurate response. In another form the electric motor may be connected in one leg or arm of a bridge circuit and the diagonal points of this bridge circuit may be connected to the coil for compensating for the voltage drop in the electric motor and for energizing the coil truely in accordance with the generated back E. M. F. and hence the direction and speed of the electric motor.

To minimize or substantially eliminate hunting or oscillation of the integrator including its electric motor, that is fluctuation of the motor speed about the steady value dictated by the condition responsive means, means are provided for prematurely and temporarily balancing the turning force applied to the rotor of the galvanometer by the condition responsive means to compensate for the inertia of the electric motor. This means is regulated by the acceleration or deceleration of the electric motor in one direction or the other. For example, it may include a condenser connected in parallel with the resistor of the first form of the invention described above or it may include a pair of condensers connected in the branches of the bridge circuit adjacent the branch containing the electric motor in the second form of the invention described above. It also may take the form of an additional coil carried by the rotor in the magnetic field of the galvanometer which is connected through a condenser to the potentiometer means controlling the electric motor.

The reversible electric motor is preferably a D. C. motor having a constant field and having its armature winding controlled by the potentiometer means of the galvanometer to provide rapid response. The condition responsive means may respond to any desired condition and may apply its turning force to the rotor of the galvanometer by being electrically connected to a coil carried by the rotor in the magnetic field or it may directly mechanically apply its turning force to the rotor of the galvanometer. While the integrator of this invention has utility in integrating substantially any condition with respect to time, it has particular utility in connection with gyro mechanisms for automatic pilot systems for crafts. For example, a rate type gyro mechanism may apply a turning force to the rotor of the galvanometer in accordance with the direction and rate of deviation of a craft. The electric motor in integrating this turning force with respect to time would then assume a position corresponding to the direction and extent of deviation of the craft with respect to a predetermined course.

Further objects of this invention reside in the details of construction of the electromechanical integrator and in the cooperative relationships between the component parts thereof.

Other objects and advantages of this invention will become apparent to those skilled in the art upon reference to the accompanying specification, claims and drawings, in which:

Figure 1:
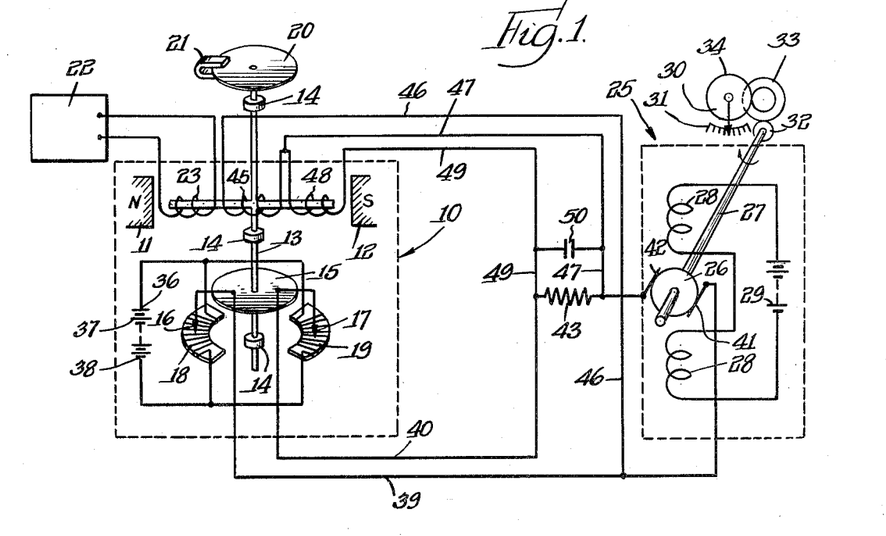
Fig. 1 is a wiring diagram of one form of the electromechanical integrator of this invention.

Referring first to Fig. 1, a galvanometer is generally designated at 10. It includes a magnet having poles 11 and 12 for establishing a magnetic field therebetween. A rotor 13 is rotatably mounted by bearings 14 for rotation about an axis transverse to the magnetic field. The rotor 13 may carry a disc 15 or the like which in turn carries a pair of contacts 16 and 17. The contacts 16 and 17 electrically contact resistance elements 18 and 19 to form a pair of adjustable potentiometers. As the rotor 13 rotates in one direction or the other the contacts 16 and 17 are moved along the resistance elements 18 and 19 for correspondingly adjusting the potentiometer means. To reduce hunting or oscillation of the rotor 13 is may be provided, if desired, with a disc 20 operating within a magnet 21, the disc 20 and magnet 21 operating as a dampener for the rotor 13.

A turning force is applied to the galvanometer 10 by means of a condition responsive device 22 responding to any desired condition. The condition responsive device 22 produces a voltage across its terminals of one polarity or of opposite polarity and of varying degree depending upon the direction of deviation of the condition and the extent of such deviation. The condition responsive device is electrically connected to a coil 23 carried by the rotor 13 in the magnetic field. The coil 23 cooperates with the magnetic field and applies a turning force to the rotor 13 of the galvanometer in one direction or the other and to a varying degree depending upon the polarity and value of the signal voltage applied thereto by the condition responsive device 22. As the rotor 13 is so turned the potentiometer means, consisting of the contacts 16 and 17 and the cooperating resistance elements 18 and 19, are correspondingly adjusted. It is here noted that preferably no spring biasing means or the like are incorporated in the galvanometer.

The electromethanical integrator of this invention also includes a reversible electric motor generally designated at 25. This electric motor 25 is preferably a D. C. motor having an armature 26 provided with the usual armature winding and carried by a shaft 27. The motor also includes field windings 28 which are permanently connected to and continuously energized by a D. C. voltage source 29. When current is applied to the armature winding in one direction the electric motor operates in one direction and when applied in the opposite direction the electric motor operates in the opposite direction.

The electric motor 25 may operate an indicator or other suitable device for indicating the time integral of the condition acting upon the electromechanical integrator. Such an indicator or the like may comprise a pointer 30 cooperating with indicia 31. The motor shaft 27 may drive the pointer 30 through a suitable speed reducer such as, for example, one consisting of a pinion 32, a cluster gear 33 and a gear 34 which in turn drives the pointer 30.

One end of each of the resistance elements 18 and 19 of the potentiometer means are connected together and to a terminal 36 of a D. C. voltage source 37. The other ends of the resistance elements 18 and 19 are also connected together and to another terminal 38 of the D. C. voltage source 37. In this way the D. C. voltage source 37 produces a graduated voltage drop across the resistance elements 18 and 19. The rotor contacts 16 and 17 are connected respectively to conductors 39 and 40. When the contacts 16 and 17 are in a mid position with respect to the resistance elements 18 and 19 no voltage appears across the conductors 39 and 40. When, however, the potentiometers are adjusted in one direction by the rotor 13 a voltage of one polarity appears across the conductors 39 and 40 and the amount of this voltage corresponds to the extent of adjustment of the potentiometer means. Likewise, when the potentiometer means are adjusted in the opposite direction, a voltage of opposite polarity appears across the conductors 39 and 40 and the value of such voltage is dependent upon the extent of this latter adjustment.

The conductor 39 is connected to a brush 41 associated with the armature winding and the conductor 40 is connected through a resistor 43 to another brush 42 associated with the armature winding. In this way the reversible electric motor 25 is driven in one direction or the other and at a speed corresponding to the adjustment of the potentiometer means of the galvanometer. When the potentiometer means are in a mid position the reversible electric motor 25 is not driven.

The rotor 13 of the galvanometer also carries another coil 45 in the magnetic field between the poles 11 and 12 and this coil 45 operates in opposition to the coil 23. The coil 45 is connected by conductors 46 and 47 to the brushes 41 and 42 of the electric motor 25 so that the coil 45 is connected in parallel with the armature winding of the electric motor. Thus the coil 45 is energized in one direction or the other by the back E. M. F. of the armature winding of the electric motor and the extent of such energization depends upon the amount of back E. M. F. and, hence, upon the speed of operation of the electric motor. A further coil 48 is also carried by the rotor 13 in the magnetic field of the galvanometer and this coil 48 operates in opposition to the coil 45. The coil 48 is connected by conductors 47 and 49 across the resistor 43. The purpose of the coil 48 and the resistor 43 is to compensate for the voltage drop across the resistance of the armature winding of the electric motor so that the galvanometer is truly operated in accordance with the back E. M. F. of the electric motor and, hence, its speed. The resistance 43 is so selected or adjusted with respect to the resistance of the armature winding that when current is passed therethrough and the armature held stationary, the coils 45 and 48 will counterbalance each other and apply no turning force to the galvanometer. The turning force applied to the galvanometer by the coils 45 and 48 is dependent upon the total number of ampere turns thereof and no turning force will be applied to the galvanometer when the motor 25 is held stationary. As the motor rotates in one direction or the other the coils 45 and 48 are energized to apply a turning force to the galvanometer rotor 13 truely in accordance with the back E. M. F. generated by the motor 25 and, hence, truely in accordance with the speed of the motor. The coils 45 and 48 cumulatively operate to produce a turning force to the galvanometer rotor 13 in opposition to the turning force applied thereto by the coil 23.

When an input voltage of one polarity or of opposite polarity is applied to the coil 23 by the condition responsive device 22, this coil generates a number of ampere turns in one direction or the opposite direction proportional to the value of the input voltage. This results in an angular displacement of the rotor 13 of the galvanometer which in turn produces a corresponding adjustment of the potentiometer means. This in turn operates the electric motor 25 in the desired direction. As the speed of the motor increases the coils 45 and 48 are correspondingly energized and a state of equilibrium is reached when the number of ampere turns generated by the coils 45 and 48 is opposite and equal to the number of ampere turns generated by the coil 23. When this occurs the total turning force or torque acting on the rotor 13 becomes zero. In this state of equilibrium the angular velocity of the motor shaft 27 is proportional to the signal voltage applied by the condition responsive device 22 and its angular displacement is proportional to the time integral of the signal voltage. All of this is accurately accomplished without any error resulting from the voltage drop across the armature resistance. Thus the direction of operation of the electric motor and its speed of operation are directly proportional to the polarity and value of the signal voltage applied by the condition responsive device 22 to the coil 23 of the galvanometer. Since the direction and speed of the electric motor follows rapidly and faithfully the signal voltage, the angular displacement of the shaft 27 of the electric motor and, hence, the indicator or the like operated thereby is accurately proportional to the time integral of the signal voltage.

Because the system has a rapid response for purposes of accuracy, sometimes an unstable behavior will result, this depending upon the amount of natural damping by friction, eddy currents or the like. If such an unstable condition occurs the system may readily be made stable by inserting a suitable impedance in the feedback network such, as for example, a capacitor 50 connected across the resistor 43. The capacitor 50 has the effect of delaying a change in current through the coil 48 upon a change in current through the resistor 43. In other words, a change in current in the armature circuit of the electric motor is not immediately sensed by the coil 48 due to the action of the condenser 50. During this time interval, immediately following the change in current flow through the armature circuit, the turning force applied by the coils 45 and 48 to the galvanometer rotor 13 is relatively large so that the galvanometer is temporarily and prematurely balanced so that when the electric motor reaches the appropriate speed further adjustment of the potentiometer means is not required. In this way hunting or oscillation of the system is effectively prevented. Toward this end the value of the capacitor is selected in accordance with the time lag and inertia characteristics of the system.

Figure 2:
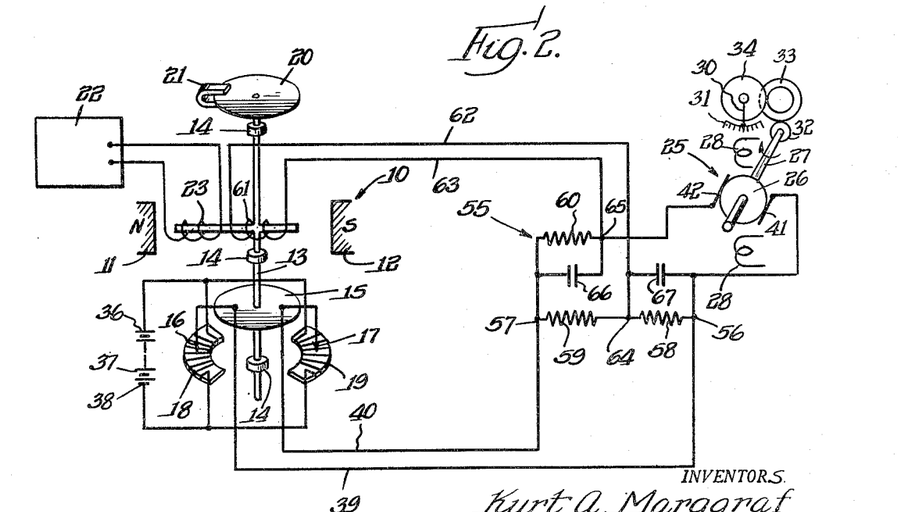
Fig. 2 is a view similar to Fig. 1 but illustrating another form of the invention.

The form of the invention illustrated in Fig. 2 is very much like that illustrated in Fig. 1 and like reference characters have been utilized for like parts. The manner of operation of this form of the invention is also very much like that of the Fig. 1 form. The main differences between the two forms of the invention are the manner in which the turning force is applied to the rotor in accordance with the back E. M. F. generated by the electric motor and in the manner in which the voltage drop across the armature resistance is compensated for. In the form of the invention illustrated in Fig. 2 there is utilized a bridge circuit generally designated at 55. The conductors 39 and 40 extending from the potentiometer means of the galvanometer are connected, respectively, to power terminals 56 and 57 of the bridge circuit 55. The bridge circuit includes three legs or arms having resistors 58, 59 and 60. The fourth leg or arm of the bridge circuit includes the armature winding of the reversible motor 25. The rotor 13 of the galvanometer carries a coil 61 in the magnetic field between the poles 11 and 12 and this coil 61 operates in opposition to the coil 23. The coil 61 is connected by conductors 62 and 63 to the diagonal points 64 and 65 of the bridge circuit 55. The resistors 58, 59 and 60 of the bridge circuit are so selected with respect to the resistance of the armature winding of the electric motor that when current is applied to the armature winding and the latter is held stationary, no voltage appears across the diagonal terminals 64 and 65 of the bridge circuit 55. In other words, under these conditions the bridge circuit is completely balanced.

However, when the electric motor 25 operates it generates a back E. M. F. of one polarity or of opposite polarity depending upon its direction of rotation and this back E. M. F. produces a voltage of one polarity or opposite polarity across the diagonal points 64 and 65 of the bridge circuit depending upon the direction of rotation of the motor. This voltage across these diagonal terminals 64 and 65 is directly proportional to the speed of rotation of the electric motor and such voltage is applied to the coil 61 for producing a turning force in opposition to the turning force produced by the coil 23. Thus, as in the Fig. 1 form of the invention, when a signal voltage is applied to the coil 23 by the condition responsive device 22, the potentiometer means is correspondingly adjusted and the electric motor is operated in a direction and at a speed corresponding to the polarity and value of the signal voltage. The back E. M. F. produced by the operation of the electric motor energizes the coil 61 to counterbalance the energization of the coil 23 to maintain the potentiometer means in proper adjusted position for operating the electric motor at a speed corresponding to the value of the signal voltage. The voltage drop across the armature resistance is also fully compensated for. The system of Fig. 2 also has a very rapid response so that the condition is accurately integrated with respect to time.

If, in the arrangement of Fig. 2, an unstable behavior should arise causing hunting or oscillation of the motor speed about the value dictated by the signal voltage, the system may be made stable by inserting suitable impedances in the bridge circuit 55. Specifically, in this form of the invention condenser 66 and 67 are connected across the resistors 60 and 58 in the two opposed bridge arms on each side of the bridge arm containing the armature winding of the motor. Upon a change in the condition causing readjustment of the potentiometer means the voltage applied to the armature winding of the motor is correspondingly changed for correspondingly changing the speed of operation of the motor. However, the condensers 66 and 67 operate temporarily to unbalance the bridge circuit upon a change of voltage applied thereto and this temporary unbalance of the bridge circuit operates cumulatively with the back E. M. F. to produce a temporary voltage differential between the diagonal points 64 and 65 of the bridge circuit 55, which in turn is applied to the coil 61. Thus, upon a change in the value of the condition the voltage across the diagonal points 64 and 65 and, hence, the current applied to the coil 61 is changed temporarily an excessive amount so as to provide a temporary and premature balancing of the galvanometer by the back E. M. F. of the electric motor. The extent and duration of the temporary premature balance may be regulated by proper selection of the condensers 66 and 67. The capacitance and charging rate values of the condensers 66 and 67 should be selected in accordance with the time lag and inertia characteristics of the system.

The single coil 61 in the galvanometer and the bridge circuit 55, including the condensers 66 and 67 of Fig. 2, operate to produce substantially the same results as the two coils 45 and 48 of the galvanometer and the resistor 43 and condenser 50 of Fig. 1. The arrangement of Fig. 2 is preferable to that of Fig. 1 in that only a single coil 61 is utilized in the galvanometer.

Figure 3:
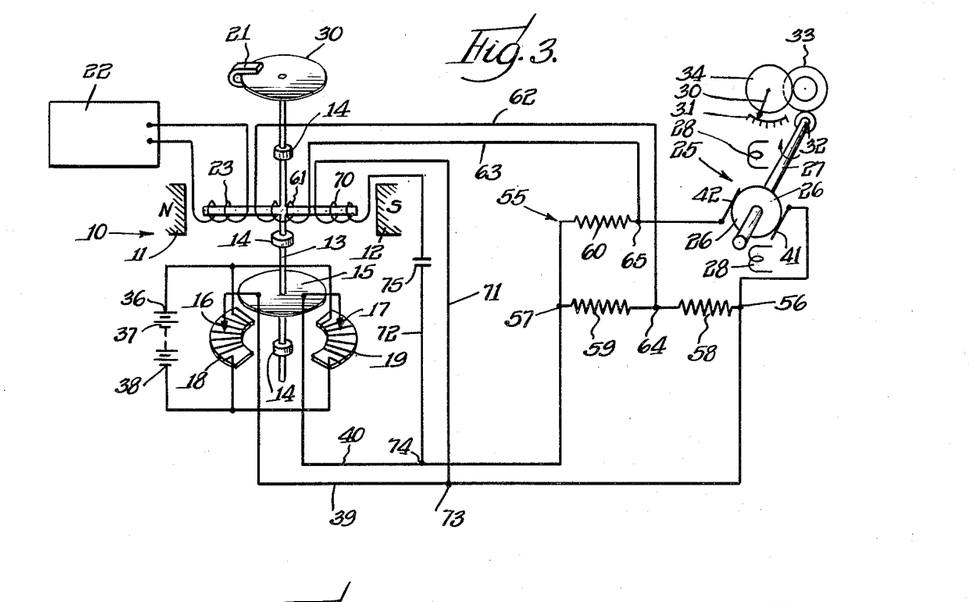
Fig. 3 is a view similar to Figs. 1 and 2 but illustrating still another form of the invention.

The form of the invention illustrated in Fig. 3 is very much like that illustrated in Fig. 2 and like reference characters have been utilized for like parts. It operates in substantially the same manner as the Figs. 1 and 2 forms. In Fig. 3 the same bridge circuit 55 is employed for compensating for the voltage drop across the armature resistance and for applying the back E. M. F. generated by the electric motor to the coil 61 in the galvanometer for counterbalancing purposes. However, in Fig. 3 a separate coil 70 is utilized for antihunting purposes to apply a premature and temporary balance to the galvanometer. Here the coil 70 is carried by the rotor 13 in the magnetic field of the galvanometer and the coil is connected by conductors 71 and 72 to the conductors 39 and 40 extending from the potentiometer means, as indicated at 73 and 74. A condenser 75 is connected in series with the coil 70. The coil 70 produces a turning force in the same direction as the coil 61 and the cumulative ampere turns of coils 61 and 70 operate to counterbalance the ampere turns of the coil 23 produced by the condition responsive device 22. When the signal voltage applied to the coil 23 changes, the potentiometer means is correspondingly adjusted to change the speed of operation of the electric motor 25 and, hence, to change the energization of the coil 61 and also to change the energization of the coil 70. The condenser 75 in series with the coil 70 causes the energization of the coil 70 to change prematurely and temporarily, whereby the counterbalancing of the galvanometer takes place prematurely and temporarily. As a result, hunting of the system of Fig. 3 may be substantially eliminated by the antihunting arrangement therein illustrated. The extra coil 70 in the galvanometer and the condenser 75 operate to produce substantially the same results as the condensers 66 and 67 in the bridge circuit of Fig. 2. While the form of the invention illustrated in Fig. 3 utilizes an extra coil in the galvanometer over that utilized in Fig. 2, nevertheless the capacitance of the condenser 75 in Fig. 3 may be considerably less than the capacitance of the condensers 66 and 67 in Fig. 2.

In the forms of the invention illustrated in Figs. 1 to 3 the condition responsive device 22 operates electrically upon the galvanometer 10 by applying a control voltage to the coil 23 for applying a turning force to the galvanometer. Of course, various types of condition responsive devices responding to various conditions may be utilized for this purpose and in accordance with the present invention, those conditions, whatever they may be, are accurately integrated with respect to time. For example, the condition responsive device 22 may be a rate type gyro mechanism for applying a signal voltage to the coil 23 in accordance with the direction and rate of deviation of a craft. Since the electromechanical integrator of this invention integrates that signal with respect to time, the pointer 30 cooperating with the indicia 31 then indicates the time integral thereof, namely, the direction and extent of deviation of the craft from a predetermined course.

Figure 4:
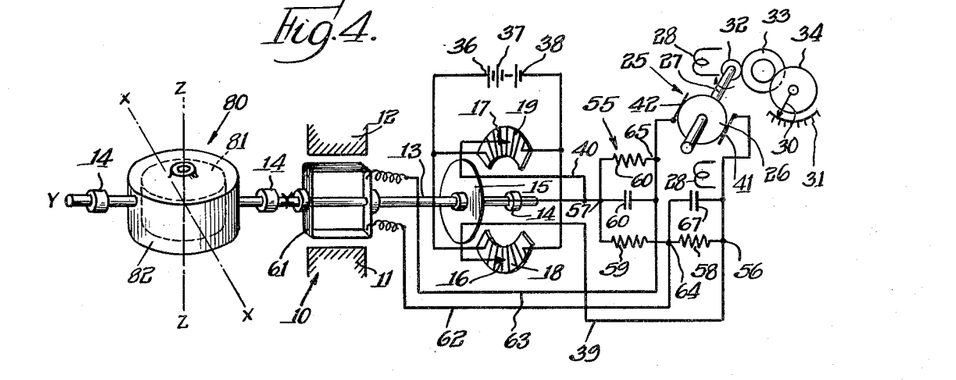
Fig. 4 is a view similar to Figs. 1, 2 and 3 but illustrating still a further form of the invention.

In Fig. 4 there is disclosed an arrangement wherein a rate type gyro mechanism is mechanically coupled to the rotor of the galvanometer for mechanically applying a turning force to the galvanometer in accordance with the direction and rate of deviation. Here the rate type gyro mechanism is generally designated at 80. It includes a rapidly revolving rotor 81 rotating about an axis Z. The rotor 81 is carried in a frame 82 which is rotatable about an axis Y which is perpendicular to the axis Z. The axis Y of the frame 82 may be an extension of the rotor 13 of the galvanometer 10, which is journaled in bearings 14. Rotation of the entire system about an axis X, which is perpendicular both to axes Y and Z, causes a precession about the axis Y. The direction of the precession and its force is dependent upon the direction and rate of rotation of the entire system about its axis X. This precession of the gyro mechanism about the axis Y mechanically applies a turning force in one direction or the other and in varying degree to the rotor 13 of the galvanometer for the purpose of adjusting the potentiometer means actuated thereby. The potentiometer means control the electric motor 25 and the counterbalancing coil 61 through a bridge circuit 55 in the same manner as in Fig. 2. The coil 61 carried by the galvanometer rotor 13 in the magnetic field applies a turning force to the galvanometer in opposition to the turning force mechanically applied by the gyro mechanism 80 in the same way that it applies a turning force in opposition to the turning force electrically produced by the coil 23 of Fig. 2. The operation of the arrangement of Fig. 4 is, therefore, substantially the same as that of Fig. 2, with the exception that the turning force in response to the condition is applied mechanically in Fig. 4 rather than electrically, as in Fig. 2. Since the precession of the gyro mechanism about its axis Y is dependent upon the direction and rate of deviation of the craft, the indicator 30 operated by the motor 25, which integrates the precession with respect to time, therefore indicates the direction and extent of deviation of the craft from a predetermined course. While Fig. 4 illustrates the galvanometer being mechanically turned by a rate type gyro mechanism, it may be directly mechanically turned by other types of condition responsive devices.

While for purposes of illustration one form of this invention has been disclosed, other forms thereof may become apparent to those skilled in the art upon reference to this disclosure and, therefore, this invention is to be limited only by the scope of the appended claims.

We claim as our invention:

1. In an electromechanical integrator for integrating a variable condition with respect to time, the combination of, a galvanometer having a magnetic field, a rotor rotatable about an axis transverse to the magnetic field and potentiometer means operated by the rotor and adjusted in one direction or the other as the rotor rotates in one direction or the other, means responsive to the condition for applying a turning force to the rotor of the galvanometer in one direction or another and in varying degree, a reversible electric motor to be positioned in accordance with the time integral of the condition, electrical connections between the potentiometer means and the reversible electric motor for actuating said electric motor in one direction or the other and at a rate corresponding to the adjustment of said potentiometer means, a coil carried by the rotor in the magnetic field of the galvanometer for applying a turning force to the rotor in opposition to the turning force applied by the condition responsive means, and means controlled by the electric motor for energizing said coil in response to the direction and rate of operation of the electric motor for balancing the turning force applied by the condition responsive means to control the electric motor and operate the same in a direction and at a rate corresponding to the direction and degree of turning force applied by the condition responsive means for positioning the motor in accordance with the time integral of the condition.

2. In an electromechanical integrator for integrating a variable condition with respect to time, the combination of, a galvanometer having a magnetic field, a rotor rotatable about an axis transverse to the magnetic field, coil means carried by the rotor in the magnetic field and potentiometer means operated by the rotor and adjusted in one direction or the other as the rotor rotates in one direction or the other, means responsive to the condition for energizing the coil means and hence applying a turning force to the rotor of the galvanometer in one direction or another and in varying degree, a reversible electric motor to be positioned in accordance with the time integral of the condition, electrical connections between the potentiometer means and the reversible electric motor for actuating said electric motor in one direction or the other and at a rate corrresponding to the adjustment of said potentiometer means, and means controlled by the electric motor for energizing the coil means and hence applying a turning force to the rotor of the galvanometer in response to the direction and rate of operation of the electric motor for balancing the turning force applied by the condition responsive means to control the electric motor and operate the same in a direction and at a rate corresponding to the direction and degree of turning force applied by the condition responsive means for positioning the motor in accordance with the time integral of the condition.

3. In an electromechanical integrator for integrating a variable condition with respect to time, the combination of, a galvanometer having a magnetic field, a rotor rotatable about an axis transverse to the magnetic field, first and second coils carried by the rotor in the magnetic field and potentiometer means operated by the rotor and adjusted in one direction or the other as the rotor rotates in one direction or the other, means responsive to the condition for energizing the first coil and hence applying a turning force to the rotor of the galvanometer in one direction or another and in varying degree, a reversible electric motor to be positioned in accordance with the time integral of the condition, electrical connections between the potentiometer means and the reversible electric motor for actuating said electric motor in one direction or the other and at a rate corresponding to the adjustment of said potentiometer means, and means controlled by the electric motor for energizing the second coil and hence applying a turning force to the rotor of the galvanometer in response to the direction and rate of operation of the electric motor for balancing the turning force applied by the condition responsive means to control the electric motor and operate the same in a direction and at a rate corresponding to the direction and degree of turning force applied by the condition responsive means for positioning the motor in accordance with the time integral of the condition.

4. In an electromechanical integrator for integrating a variable condition with respect to time, the combination of, a galvanometer having a magnetic field, a rotor rotatable about an axis transverse to the magnetic field and potentiometer means operated by the rotor and adjusted in one direction or the other as the rotor rotates in one direction or the other, means responsive to the condition for applying a turning force to the rotor of the galvanometer in one direction or another and in varying degree, a reversible electric motor to be positioned in accordance with the time integral of the condition, electrical connections between the potentiometer means and the reversible electric motor for actuating said electric motor in one direction or the other and at a rate corresponding to the adjustment of said potentiometer means, coil means carried by the rotor in the magnetic field of the galvanometer for applying a turning force to the rotor in opposition to the turning force applied by the condition responsive means, means controlled by the electric motor for energizing said coil means in response to the direction and rate of operation of the electric motor for balancing the turning force applied by the condition responsive means to control the electric motor and operate the same in a direction and at a rate corresponding to the direction and degree of turning force applied by the condition responsive means for positioning the motor in accordance with the time integral of the condition, and means regulated by the acceleration or deceleration of the electric motor in one direction or the other for energizing the coil means prematurely and temporarily to balance the turning force applied by the condition responsive means for compensating for the inertia of the electric motor to minimize hunting thereby.

5. In an electromechanical integrator for integrating a variable condition with respect to time, the combination of, a galvanometer having a magnetic field, a rotor rotatable about an axis transverse to the magnetic field and potentiometer means operated by the rotor and adjusted in one direction or the other as the rotor rotates in one direction or the other, means responsive to the condition for applying a turning force to the rotor of the galvanometer in one direction or another and in varying degree, a reversible electric motor to be positioned in accordance with the time integral of the condition, electrical connections between the potentiometer means and the reversible electric motor for actuating said electric motor in one direction or the other and at a rate corresponding to the adjustment of said potentiometer means, coil means carried by the rotor in the magnetic field of the galvanometer for applying a turning force to the rotor in opposition to the turning force applied by the condition responsive means, and means for connecting the coil means to the electrical connections between the potentiometer means and the electric motor for energizing the coil means in response to the direction and rate of operation of the electric motor for balancing the turning force applied by the condition responsive means to control the electric motor and operate the same in a direction and at a rate corresponding to the direction and degree of turning force applied by the condition responsive means for positioning the motor in accordance with the time integral of the condition.

6. In an electromechanical integrator for integrating a variable condition with respect to time, the combination of, a galvanometer having a magnetic field, a rotor rotatable about an axis transverse to the magnetic field and potentiometer means operated by the rotor and adjusted in one direction or the other as the rotor rotates in one direction or the other, means responsive to the condition for applying a turning force to the rotor of the galvanometer in one direction or another and in varying degree, a reversible electric motor to be positioned in accordance with the time integral of the condition, electrical connections between the potentiometer means and the reversible electric motor for actuating said electric motor in one direction or the other and at a rate corresponding to the adjustment of said potentiometer means, coil means carried by the rotor in the magnetic field of the galvanometer for applying a turning force to the rotor in opposition to the turning force applied by the condition responsive means, means for connecting the coil means to the electrical connections between the potentiometer means and the electric motor for energizing the coil means in response to the direction and rate of operation of the electric motor for balancing the turning force applied by the condition responsive means to control the electric motor and operate the same in a direction and at a rate corresponding to the direction and degree of turning force applied by the condition responsive means for positioning the motor in accordance with the time integral of the condition, and means regulated by the acceleration or deceleration of the electric motor in one direction or the other for energizing the coil means prematurely and temporarily to balance the turning force applied by the condition responsive means for compensating for the inertia of the electric motor to minimize hunting thereby.

7. In an electromechanical integrator for integrating a variable condition with respect to time, the combination of, a galvanometer having a magnetic field, a rotor rotatable about an axis transverse to the magnetic field and potentiometer means operated by the rotor and adjusted in one direction or the other as the rotor rotates in one direction or the other, means responsive to the condition for applying a turning force to the rotor of the galvanometer in one direction or another and in varying degree, a reversible electric motor to be positioned in accordance with the time integral of the condition, electrical connections between the potentiometer means and the reversible electric motor for actuating said electric motor in one direction or the other and at a rate corresponding to the adjustment of said potentiometer means, a pair of coils carried by the rotor in the magnetic field of the galvanometer for applying a turning force to the rotor in opposition to the turning force applied by the condition responsive means, a resistor in the electrical connections between the potentiometer means and the electric motor, and means for connecting one of the coils in parallel with the electric motor and the other coil in parallel with the resistor for compensating for the voltage drop across the electric motor and for energizing the pair of coils in response to the direction and amount of back E. M. F. of the electric motor and hence the direction and rate of operation of the electric motor for balancing the turning force applied by the condition responsive means to control the electric motor and operate the same in a direction and at a rate corresponding to the direction and degree of turning force applied by the condition responsive means for positioning the motor in accordance with the time integral of the condition.

8. In an electromechanical integrator for integrating a variable condition with respect to time, the combination of, a galvanometer having a magnetic field, a rotor rotatable about an axis transverse to the magnetic field and potentiometer means operated by the rotor and adjusted in one direction or the other as the rotor rotates in one direction or the other, means responsive to the condition for applying a turning force to the rotor of the galvanometer in one direction or another and in varying degree, a reversible electric motor to be positioned in accordance with the time integral of the condition, electrical connections between the potentiometer means and the reversible electric motor for actuating said electric motor in one direction or the other and at a rate corresponding to the adjustment of said potentiometer means, a pair of coils carried by the rotor in the magnetic field of the galvanometer for applying a turning force to the rotor in opposition to the turning force applied by the condition responsive means, a resistor in the electrical connections between the potentiometer means and the electric motor, means for connecting one of the coils in parallel with the electric motor and the other coil in parallel with the resistor for compensating for the voltage drop across the electric motor and for energizing the pair of coils in response to the direction and amount of back E. M. F. of the electric motor and hence the direction and rate of operation of the electric motor for balancing the turning force applied by the condition responsive means to control the electric motor and operate the same in a direction and at a rate corresponding to the direction and degree of turning force applied by the condition responsive means for positioning the motor in accordance with the time integral of the condition, and means regulated by the acceleration or deceleration of the electric motor in one direction or the other for energizing the pair of coils prematurely and temporarily to balance the turning force applied by the condition responsive means for compensating for the inertia of the electric motor to minimize hunting thereby.

9. In an electromechanical integrator for integrating a variable condition with respect to time, the combination of, a galvanometer having a magnetic field, a rotor rotatable about an axis transverse to the magnetic field and potentiometer means operated by the rotor and adjusted in one direction or the other as the rotor rotates in one direction or the other, means responsive to the condition for applying a turning force to the rotor of the galvanometer in one direction or another and in varying degree, a reversible electric motor to be positioned in accordance with the time integral of the condition, electrical connections between the potentiometer means and the reversible electric motor for actuating said electric motor in one direction or the other and at a rate corresponding to the adjustment of said potentiometer means, a pair of coils carried by the rotor in the magnetic field of the galvanometer for applying a turning force to the rotor in opposition to the turning force applied by the condition responsive means, a resistor in the electrical connections between the potentiometer means and the electric motor, means for connecting one of the coils in parallel with the electric motor and the other coil in parallel with the resistor for compensating for the voltage drop across the electric motor and for energizing the pair of coils in response to the direction and amount of back E. M. F. of the electric motor and hence the direction and rate of operation of the electric motor for balancing the turning force applied by the condition responsive means to control the electric motor and operate the same in a direction and at a rate corresponding to the direction and degree of turning force applied by the condition responsive means for positioning the motor in accordance with the time integral of the condition, and a condenser connected across said resistor for controlling the energization of said pair of coils prematurely and temporarily to balance the turning force applied by the condition responsive means for compensating for the inertia of the electric motor to minimize hunting thereby.

10. In an electromechanical integrator for integrating a variable condition with respect to time, the combination of, a galvanometer having a magnetic field, a rotor rotatable about an axis transverse to the magnetic field and potentiometer means operated by the rotor and adjusted in one direction or the other as the rotor rotates in one direction or the other, means responsive to the condition for applying a turning force to the rotor of the galvanometer in one direction or another and in varying degree, a reversible electric motor to be positioned in accordance with the time integral of the condition, electrical connections between the potentiometer means and the reversible electric motor for actuating said electric motor in one direction or the other and at a rate corresponding to the adjustment of said potentiometer means, a coil carried by the rotor in the magnetic field of the galvanometer for applying a turning force to the rotor in opposition to the turning force applied by the condition responsive means, a bridge circuit included in said electrical connections with the electric motor included within one arm of the bridge circuit, and means for connecting the coil to the diagonal points of said bridge circuit for compensating for the voltage drop across the electric motor and for energizing the coil in response to the direction and rate of operation of the electric motor for balancing the turning force applied by the condition responsive means to control the electric motor and operate the same in a direction and at a rate corresponding to the direction and degree of turning force applied by the condition responsive means for positioning the motor in accordance with the time integral of the condition.

11. In an electromechanical integrator for integrating a variable condition with respect to time, the combination of, a galvanometer having a magnetic field, a rotor rotatable about an axis transverse to the magnetic field and potentiometer means operated by the rotor and adjusted in one direction or the other as the rotor rotates in one direction or the other, means responsive to the condition for applying a turning force to the rotor of the galvanometer in one direction or another and in varying degree, a reversible electric motor to be positioned in accordance with the time integral of the condition, electrical connections between the potentiometer means and the reversible electric motor for actuating said electric motor in one direction or the other and at a rate corresponding to the adjustment of said potentiometer means, coil means carried by the rotor in the magnetic field of the galvanometer for applying a turning force to the rotor in opposition to the turning force applied by the condition responsive means, a bridge circuit included in said electrical connections with the electric motor included within one arm of the bridge circuit, means for connecting the coil means to the diagonal points of said bridge circuit for compensating for the voltage drop across the electric motor and for energizing the coil means in response to the direction and rate of operation of the electric motor for balancing the turning force applied by the condition responsive means to control the electric motor and operate the same in a direction and at a rate corresponding to the direction and degree of turning force applied by the condition responsive means for positioning the motor in accordance with the time integral of the condition, and means regulated by the acceleration or deceleration of the electric motor in one direction or the other for energizing the coil means prematurely and temporarily to balance the turning force applied by the condition responsive means for compensating for the inertia of the electric motor to minimize hunting thereby.

12. In an electromechanical integrator for integrating a variable condition with respect to time, the combination of, a galvanometer having a magnetic field, a rotor rotatable about an axis transverse to the magnetic field and potentiometer means operated by the rotor and adjusted in one direction or the other as the rotor rotates in one direction or the other, means responsive to the condition for applying a turning force to the rotor of the galvanometer in one direction or another and in varying degree, a reversible electric motor to be positioned in accordance with the time integral of the condition, electrical connections between the potentiometer means and the reversible electric motor for actuating said electric motor in one direction or the other and at a rate corresponding to the adjustment of said potentiometer means, a coil carried by the rotor in the magnetic field of the galvanometer for applying a turning force to the rotor in opposition to the turning force applied by the condition responsive means, a bridge circuit included in said electrical connections with the electric motor included within one arm of the bridge circuit, means for connecting the coil to the diagonal points of said bridge circuit for compensating for the voltage drop across the electric motor and for energizing the coil in response to the direction and rate of operation of the electric motor for balancing the turning force applied by the condition responsive means to control the electric motor and operate the same in a direction and at a rate corresponding to the direction and degree of turning force applied by the condition responsive means for positioning the motor in accordance with the time integral of the condition, and a pair of condensers connected in the arms of the bridge circuit adjacent the electric motor for controlling the energization of the coil prematurely and temporarily to balance the turning force applied by the condition responsive means for compensating for the inertia of the electric motor to minimize hunting thereby.

13. In an electromechanical integrator for integrating a variable condition with respect to time, the combination of, a galvanometer having a magnetic field, a rotor rotatable about an axis transverse to the magnetic field and potentiometer means operated by the rotor and adjusted in one direction or the other as the rotor rotates in one direction or the other, means responsive to the condition for applying a turning force to the rotor of the galvanometer in one direction or another and in varying degree, a reversible electric motor to be positioned in accordance with the time interval of the condition, electrical connections between the potentiometer means and the reversible electric motor for actuating said electric motor in one direction or the other and at a rate corresponding to the adjustment of said potentiometer means, a coil carried by the rotor in the magnetic field of the galvanometer for applying a turning force to the rotor in opposition to the turning force applied by the condition responsive means, a bridge circuit included in said electrical connections with the electric motor included within one arm of the bridge circuit, means for connecting the coil to the diagonal points of said bridge circuit for compensating for the voltage drop across the electric motor and for energizing the coil in response to the direction and rate of operation of the electric motor for balancing the turning force applied by the condition responsive means to control the electric motor and operate the same in a direction and at a rate corresponding to the direction and degree of turning force applied by the condition responsive means for positioning the motor in accordance with the time integral of the condition, a second coil carried by the rotor in the magnetic field of the galvanometer, and electrical connections including a condenser for connecting the second coil to the potentiometer means for energizing the second coil prematurely and temporarily to balance the turning force applied by the condition responsive means for compensating for the inertia of the electric motor to minimize hunting thereby.

14. In an electromechanical integrator for integrating a variable condition with respect to time, the combination of, a galvanometer having a magnetic field, a rotor rotatable about an axis transverse to the magnetic field, first and second coils carried by the rotor in the magnetic field and potentiometer means operated by the rotor and adjusted in one direction or the other as the rotor rotates in one direction or the other, means responsive to the condition for energizing the first coil and hence applying a turning force to the rotor of the galvanometer in one direction or another and in varying degree, a reversible electric motor to be positioned in accordance with the time integral of the condition, electrical connections between the potentiometer means and the reversible electric motor for actuating said electric motor in one direction or the other and at a rate corresponding to the adjustment of said potentiometer means, a bridge circuit included in said electrical connections with the electric motor included within one arm of the bridge circuit, means for connecting the second coil to the diagonal points of said bridge circuit for compensating for the voltage drop across the electric motor and for energizing the second coil in response to the direction and rate of operation of the electric motor for balancing the turning force applied by the condition responsive means to control the electric motor and operate the same in a direction and at a rate corresponding to the direction and degree of turning force applied by the condition responsive means for positioning the motor in accordance with the time integral of the condition, and a pair of condensers connected in the arms of the bridge circuit adjacent the electric motor for controlling the energization of the coil prematurely and temporarily to balance the turning force applied by the condition responsive means for compensating for the inertia of the electric motor to minimize hunting thereby.

15. In an electromechanical integrator for integrating a variable condition with respect to time, the combination of, a galvanometer having a magnetic field, a rotor rotatable about an axis transverse to the magnetic field and potentiometer means operated by the rotor and adjusted in one direction or the other as the rotor rotates in one direction or the other, mechanically operating means responsive to the condition for mechanically applying a turning force to the rotor of the galvanometer in one direction or another and in varying degree, a reversible electric motor to be positioned in accordance with the time integral of the condition, electrical connections between the potentiometer means and the reversible electric motor for actuating said electric motor in one direction or the other and at a rate corresponding to the adjustment of said potentiometer means, a coil carried by the rotor in the magnetic field of the galvanometer for applying a turning force to the rotor in opposition to the turning force applied by the condition responsive means, and means controlled by the electric motor for energizing said coil in response to the direction and rate of operation of the electric motor for balancing the turning force applied by the condition responsive means to control the electric motor and operate the same in a direction and at a rate corresponding to the direction and degree of turning force applied by the condition responsive means for positioning the motor in accordance with the time integral of the condition.

16. In an electromechanical integrator for integrating a variable condition with respect to time, the combination of, a galvanometer having a magnetic field, a rotor rotatable about an axis transverse to the magnetic field and potentiometer means operated by the rotor and adjusted in one direction or the other as the rotor rotates in one direction or the other, mechanically operating means responsive to the condition for mechanically applying a turning force to the rotor of the galvanometer in one direction or another and in varying degree, a reversible electric motor to be positioned in accordance with the time integral of the condition, electrical connections between the potentiometer means and the reversible electric motor for actuating said electric motor in one direction or the other and at a rate corresponding to the adjustment of said potentiometer means, coil means carried by the rotor in the magnetic field of the galvanometer for applying a turning force to the rotor in opposition to the turning force applied by the condition responsive means, means controlled by the electric motor for energizing said coil means in response to the direction and rate of operation of the electric motor for balancing the turning force applied by the condition responsive means to control the electric motor and operate the same in a direction and at a rate corresponding to the direction and degree of turning force applied by the condition responsive means for positioning the motor in accordance with the time integral of the condition, and means regulated by the acceleration or deceleration of the electric motor in one direction or the other for energizing the coil means prematurely and temporarily to balance the turning force applied by the condition responsive means for compensating for the inertia of the electric motor to minimize hunting thereby.

17. In an electromechanical integrator for integrating a variable condition with respect to time, the combination of, a galvanometer having a magnetic field, a rotor rotatable about an axis transverse to the magnetic field and potentiometer means operated by the rotor and adjusted in one direction or the other as the rotor rotates in one direction or the other, means responsive to the condition for applying a turning force to the rotor of the galvanometer in one direction or another and in varying degree, a reversible D. C. electric motor having a permanently energized field winding and an armature winding and to be positioned in accordance with the time integral of the condition, electrical connections between a source of D. C. voltage, the potentiometer means and the armature winding for actuating the electric motor in one direction or the other and at a rate corresponding to the adjustment of said potentiometer means, a coil carried by the rotor in the magnetic field of the galvanometer for applying a turning force to the rotor in opposition to the turning force applied by the condition responsive means, and means for connecting the coil to the electrical connections to the armature winding of the electric motor for energizing the coil in response to the direction and amount of back E. M. F. of the armature winding and hence the direction and rate of operation of the electric motor for balancing the turning force applied by the condition responsive means to control the electric motor and operate the same in a direction and at a rate corresponding to the direction and degree of turning force applied by the condition responsive means for positioning the motor in accordance with the time integral of the condition.

18. In an electromechanical integrator for integrating a variable condition with respect to time, the combination of, a galvanometer having a magnetic field, a rotor rotatable about an axis transverse to the magnetic field and potentiometer means operated by the rotor and adjusted in one direction or the other as the rotor rotates in one direction or the other, means responsive to the condition for applying a turning force to the rotor of the galvanometer in one direction or another and in varying degree, a reversible D. C. electric motor having a permanently energized field winding and an armature winding and to be positioned in accordance with the time integral of the condition, electrical connections between a source of D. C. voltage, the potentiometer means and the armature winding for actuating the electric motor in one direction or the other and at a rate corresponding to the adjustment of said potentiometer means, a coil carried by the rotor in the magnetic field of the galvanometer for applying a turning force to the rotor in opposition to the turning force applied by the condition responsive means, and electrical connections for connecting the coil in parallel with the armature winding of the electric motor for energizing the coil in response to the direction and amount of back E. M. F. of the armature and hence the direction and rate of operation of the electric motor for balancing the turning force applied by the condition responsive means to control the electric motor and operate the same in a direction and at a rate corresponding to the direction and degree of turning force applied by the condition responsive means for positioning the motor in accordance with the time integral of the condition.

19. In an electromechanical integrator for integrating a variable condition with respect to time, the combination of, a galvanometer having a magnetic field, a rotor rotatable about an axis transverse to the magnetic field and potentiometer means operated by the rotor and adjusted in one direction or the other as the rotor rotates in one direction or the other, means responsive to the condition for applying a turning force to the rotor of the galvanometer in one direction or another and in varying degree, a reversible D. C. electric motor having a permanently energized field winding and an armature winding and to be positioned in accordance with the time integral of the condition, electrical connections between a source of D. C. voltage, the potentiometer means and the armature winding for actuating the electric motor in one direction or the other and at a rate corresponding to the adjustment of said potentiometer means, a coil carried by the rotor in the magnetic field of the galvanometer for applying a turning force to the rotor in opposition to the turning force applied by the condition responsive means, electrical connections for connecting the coil in parallel with the armature winding of the electric motor for energizing the coil in response to the direction and amount of back E. M. F. of the armature and hence the direction and rate of operation of the electric motor for balancing the turning force applied by the condition responsive means to control the electric motor and operate the same in a direction and at a rate corresponding to the direction and degree of turning force applied by the condition responsive means for positioning the motor in accordance with the time integral of the condition, a second coil carried by the rotor in the magnetic field of the galvanometer for applying a turning force to the galvanometer in opposition to the turning force applied by the first coil, a resistor in series with the armature winding of the electric motor, and electrical connections for connecting the second coil in parallel with the resistor for compensating for the voltage drop across the armature winding of the electric motor.

20. In an electromechanical integrator for integrating a variable condition with respect to time, the combination of, a galvanometer having a magnetic field, a rotor rotatable about an axis transverse to the magnetic field and potentiometer means operated by the rotor and adjusted in one direction or the other as the rotor rotates in one direction or the other, means responsive to the condition for applying a turning force to the rotor of the galvanometer in one direction or another and in varying degree, a reversible D. C. electric motor having a permanently energized field winding and an armature winding and to be positioned in accordance with the time integral of the condition, a bridge circuit including the armature winding of the electric motor in one arm of the bridge circuit, electrical connections between a source of D. C. voltage, the potentiometer means and the energizing points of the bridge circuit for energizing the armature winding for actuating the electric motor in one direction or another and at a rate corresponding to the adjustment of the potentiometer means, a coil carried by the rotor in the magnetic field of the galvanometer for applying a turning force to the rotor in opposition to the turning force applied by the condition responsive means, and electrical connections for connecting the coil to the diagonal points of the bridge circuit for compensating for the voltage drop across the armature winding of the electric motor and for energizing the coil in response to the direction and amount of back E. M. F. of the armature winding and hence the direction and rate of operation of the electric motor for balancing the turning force applied by the condition responsive means to control the electric motor and operate the same in a direction and at a rate corresponding to the direction and degree of turning force applied by the condition responsive means for positioning the motor in accordance with the time integral of the condition.

21. In an electromechanical integrator for integrating a variable condition with respect to time, the combination of, a galvanometer having a magnetic field, a rotor rotatable about an axis transverse to the magnetic field and potentiometer means operated by the rotor and adjusted in one direction or the other as the rotor rotates in one direction or the other, means responsive to the condition for applying a turning force to the rotor of the galvanometer in one direction or another and in varying degree, a reversible D. C. electric motor having a permanently energized field winding and an armature winding and to be positioned in accordance with the time integral of the condition, electrical connections between a source of D. C. voltage, the potentiometer means and the armature winding for actuating the electric motor in one direction or the other and at a rate corresponding to the adjustment of said potentiometer means, a coil carried by the rotor in the magnetic field of the galvanometer for applying a turning force to the rotor in opposition to the turning force applied by the condition responsive means, electrical connections for connecting the coil in parallel with the armature winding of the electric motor for energizing the coil in response to the direction and amount of back E. M. F. of the armature and hence the direction and rate of operation of the electric motor for balancing the turning force applied by the condition responsive means to control the electric motor and operate the same in a direction and at a rate corresponding to the direction and degree of turning force applied by the condition responsive means for positioning the motor in accordance with the time integral of the condition, a second coil carried by the rotor in the magnetic field of the galvanometer for applying a turning force to the galvanometer in opposition to the turning force applied by the first coil, a resistor in series with the armature winding of the electric motor, electrical connections for connecting the second coil in parallel with the resistor for compensating for the voltage drop across the armature winding of the electric motor, and a condenser connected across said resistor for controlling the energization of said second coil prematurely and temporarily to balance the turning force applied by the condition responsive means for compensating for the inertia of the electric motor to minimize hunting thereby.

22. In an electromechanical integrator for integrating a variable condition with respect to time, the combination of, a galvanometer having a magnetic field, a rotor rotatable about an axis transverse to the magnetic field and potentiometer means operated by the rotor and adjusted in one direction or the other as the rotor rotates in one direction or the other, means responsive to the condition for applying a turning force to the rotor of the galvanometer in one direction or another and in varying degree, a reversible D. C. electric motor having a permanently energized field winding and an armature winding and to be positioned in accordance with the time integral of the condition, a bridge circuit including the armature winding of the electric motor in one arm of the bridge circuit, electrical connections between a source of D. C. voltage, the potentiometer means and the energizing points of the bridge circuit for energizing the armature winding for actuating the electric motor in one direction or another and at a rate corresponding to the adjustment of the potentiometer means, a coil carried by the rotor in the magnetic field of the galvanometer for applying a turning force to the rotor in opposition to the turning force applied by the condition responsive means, electrical connections for connecting the coil to the diagonal points of the bridge circuit for compensating for the voltage drop across the armature winding of the electric motor and for energizing the coil in response to the direction and amount of back E. M. F. of the armature winding and hence the direction and rate of operation of the electric motor for balancing the turning force applied by the condition responsive means to control the electric motor and operate the same in a direction and at a rate corresponding to the direction and degree of turning force applied by the condition responsive means for positioning the motor in accordance with the time integral of the condition, and a pair of condensers connected in the arms of the bridge circuit adjacent the arm containing the armature winding of the electric motor for controlling the energization of the coil prematurely and temporarily to balance the turning force applied by the condition responsive means for compensating for the inertia of the electric motor to minimize hunting thereby.

23. In an electromechanical integrator for integrating a variable condition with respect to time, the combination of, a galvanometer having a magnetic field, a rotor rotatable about an axis transverse to the magnetic field and potentiometer means operated by the rotor and adjusted in one direction or the other as the rotor rotates in one direction or the other, means responsive to the condition for applying a turning force to the rotor of the galvanometer in one direction or another and in varying degree, a reversible D. C. electric motor having a permanently energized field winding and an armature winding and to be positioned in accordance with the time integral of the condition, a bridge circuit including the armature winding of the electric motor in one arm of the bridge circuit, electrical connections between a source of D. C. voltage, the potentiometer means and the energizing points of the bridge circuit for energizing the armature winding for actuating the electric motor in one direction or another and at a rate corresponding to the adjustment of the potentiometer means, a coil carried by the rotor in the magnetic field of the galvanometer for applying a turning force to the rotor in opposition to the turning force applied by the condition responsive means, electrical connections for connecting the coil to the diagonal points of the bridge circuit for compensating for the voltage drop across the armature winding of the electric motor and for energizing the coil in response to the direction and amount of back E. M. F. of the armature winding and hence the direction and rate of operation of the electric motor for balancing the turning force applied by the condition responsive means to control the electric motor and operate the same in a direction and at a rate corresponding to the direction and degree of turning force applied by the condition responsive means for positioning the motor in accordance with the time integral of the condition, a second coil carried by the rotor in the magnetic field of the galvanometer, and electrical connections including a condenser for connecting the second coil to the potentiometer means for energizing the second coil prematurely and temporarily to balance the turning force applied by the condition responsive means for compensating for the inertia of the electric motor to minimize hunting thereby.

References Cited in the file of this patent
UNITED STATES PATENTS

| Number | Name | Date |
| --- | --- | --- |
| 2,383,942 | Patin | Sept. 4, 1945 |
| 2,591,938 | Holliday | Apr. 8, 1952 |